(12) United States Patent
Franke et al.

(10) Patent No.: US 6,446,601 B1
(45) Date of Patent: Sep. 10, 2002

(54) IGNITION CONTROL METHOD

(75) Inventors: Steffen Franke, Denham Uxbridge (GB); Oskar Torno, Schwieberdingen (DE); Carsten Kluth, Stuttgart (DE); Werner Haeming, Neudenau (DE); Iwan Surjadi, Vaihingen (DE); Michael Baeuerle, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/700,290

(22) PCT Filed: May 10, 1999

(86) PCT No.: PCT/DE99/01404
§ 371 (c)(1),
(2), (4) Date: Feb. 16, 2001

(87) PCT Pub. No.: WO99/58849
PCT Pub. Date: Nov. 18, 1999

(30) Foreign Application Priority Data

May 12, 1998 (DE) .......................................... 198 21 132
Oct. 13, 1998 (DE) .......................................... 198 47 023

(51) Int. Cl.[7] ................................................. F02P 1/152
(52) U.S. Cl. .............................. 123/406.33; 123/406.36
(58) Field of Search ....................... 123/406.33, 406.36, 123/406.39

(56) References Cited

U.S. PATENT DOCUMENTS

| | | | |
|---|---|---|---|
| 4,357,918 A | 11/1982 | Asano | 123/406.36 |
| 4,640,249 A | 2/1987 | Kawamura et al. | 123/406.33 |
| 4,697,563 A | * 10/1987 | Becker et al. | 123/406.51 |
| 4,736,723 A | 4/1988 | Nagai | 123/406.33 |
| 5,653,209 A | * 8/1997 | Johansson et al. | 123/435 |

FOREIGN PATENT DOCUMENTS

| | | |
|---|---|---|
| DE | 40 11 386 | 10/1991 |
| DE | 41 09 429 | 9/1992 |
| DE | 40 16 129 | 10/1994 |
| DE | 44 22 117 | 1/1995 |
| DE | 33 13 036 | 2/1997 |
| DE | 196 30 213 | 7/1997 |
| JP | 04 081 575 | 3/1992 |

* cited by examiner

Primary Examiner—Tony M. Argenbright
(74) Attorney, Agent, or Firm—Kenyon & Kenyon

(57) ABSTRACT

A method for ignition control is described in which the load gradient is determined. The load gradient is compared with a first specifiable dynamic threshold and the ignition control variable is additively retarded by application of an adaptable dynamic derivative action if the load gradient exceeds the first dynamic threshold. If the load gradient exceeds a second specifiable dynamic threshold and no knock occurs, then the output dynamic derivative action is reduced so that the ignition is advanced again.

5 Claims, 2 Drawing Sheets

IGNITION CONTROL METHOD

FIELD OF THE INVENTION

The present invention relates to a method for determining the ignition control variables for an internal combustion engine with occurring acceleration.

BACKGROUND INFORMATION

A method for determining ignition control variables is described in "Bosch Technische Unterrichtung, Kombiniertes Zünd-und Benzineinspritzsystem mit Lambda-Regelung, Motronic" (Bosch Technical Instruction, Combined Ignition And Fuel Injection System With Lambda Control, Motronic) (1987722011, KH/VDT-09.895-DE).

In this known ignition control unit, the various operating parameters such as rpm, load, pressure, temperature are detected via appropriate sensors at the periphery of the internal combustion engine and the relayed to the control unit. The detected sensor signals are processed in assigned sensor signal processing circuits and units, respectively, it being possible for such processing circuits to be arranged both outside the control unit and within the control unit itself. An arithmetic processor of the control unit then determines the corresponding ignition control variable based on, among other things, the signals available, preferably based on the rpm signal and load signal. For this determination an ignition map is stored in the control unit which spans rpm and load. The engine characteristics maps have been, for example, determined previously on an engine test bench in the application corresponding to optimum operating conditions. A knock control is assigned to this determination of the ignition control variable, the knock control retarding the ignition point from the knock limit after a combustion knock in that cylinder. Moreover, an additive adjustment of the ignition point obtained from the engine characteristics map is assigned to the determination of ignition point, the additive adjustment shifting the previously determined ignition point as a function of the occurring dynamics. By calculating in a dynamic derivative action, the ignition point is retarded. Subsequently, this additive adjustment is regulated over time and the ignition point is again changed in the direction of the engine characteristics map ignition point. The additive change ensures that the ignition point is not too close to the knock limit, thereby avoiding combustion knock. Finally, under acceleration, the adjustment of the ignition point results in a maximum torque being supplied. With extreme acceleration which would result in an abrupt change in the ignition point and consequently a deterioration of performance, this change is implemented slowly and only in cases in which a rapid change is absolutely necessary, for example, in the transition from part load to full load, does the control unit allow a rapid, abrupt change.

SUMMARY OF THE INVENTION

In contrast to the known methods, the method according to the present invention has the advantage that by introducing a second dynamic threshold, from which an adaptation of the dynamic derivative action to advanced takes place, the operation of the internal combustion engine takes into account the requirements that a low dynamic threshold for the output of the derivative action and a high dynamic threshold for the adaptation to advanced are established. This results in an improved interaction between the adaptation and the output of the dynamic derivative action and consequently its effectiveness.

It is particularly advantageous to determine the two dynamic thresholds in the application and to store them in a memory. An additional advantage results from storing the dynamic derivative action to be output when the first dynamic threshold is exceeded in an engine characteristics map which spans load and rpm. In this way, the change of the ignition point can be adapted very effectively to the instantaneous operating state. Finally, an additional advantage results from the stepwise return of the adaptation of the dynamic derivative action to advanced since this results in smoother vehicle performance and consequently greater ride comfort.

DETAILED DESCRIPTION

Figure 1:
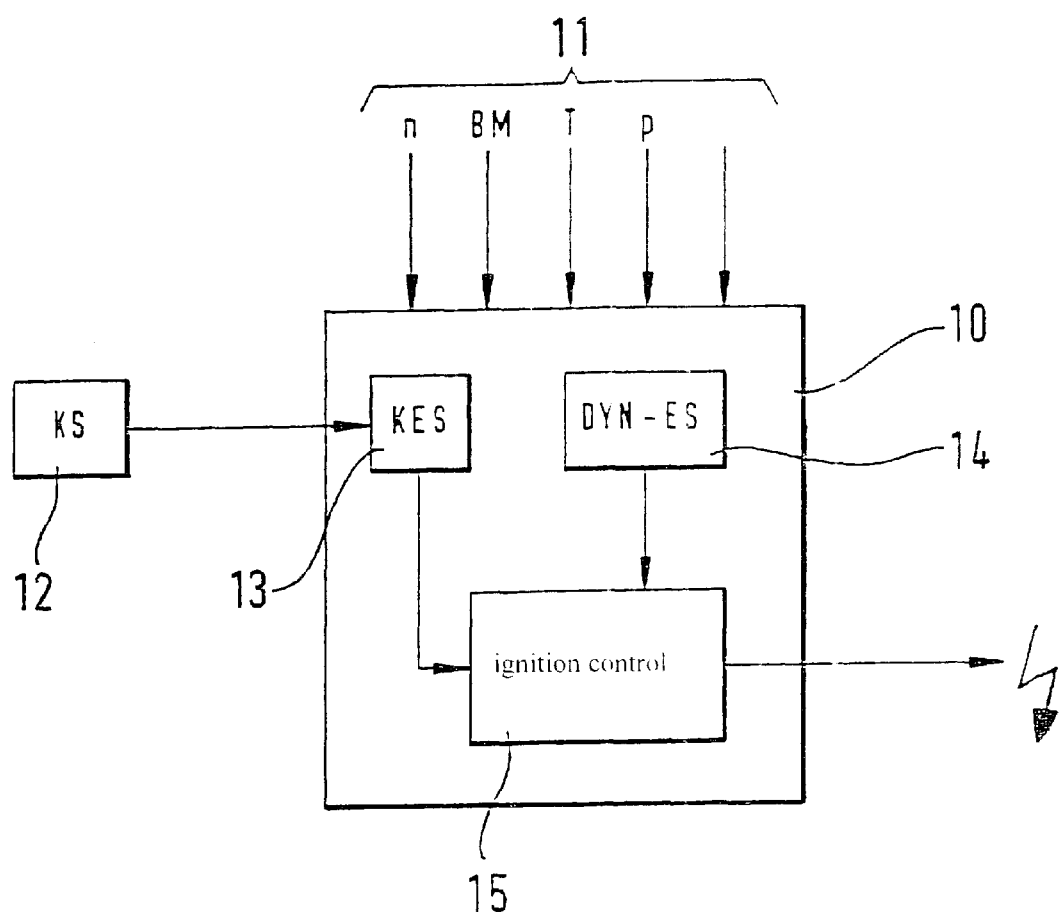
FIG. 1 shows a basic configuration of the control unit for implementing the method according to the present invention.

FIG. 1 shows the basic structure of a control unit for determining the ignition control variable. In this case, the operating parameters detected by sensors such as rpm n, reference mark BM, temperature T, pressure p, etc. are supplied as input variables to a control unit 10. In addition, the signal from at least one knock sensor KS 12 is supplied to control unit 10. An element 13 for knock recognition is provided in control unit 10 to which the knock signal is sent. Whether combustion knock has occurred is recognized in a known manner by comparison with a standardized reference level as has already been described in numerous publications so that this will not be described in detail once more here. In addition, a dynamic recognition stage 14 is provided in the control unit which, for example, analyzes rpm signal n or the position of the throttle valve and thus determines whether the internal combustion engine is in the dynamic state. Moreover, an ignition control unit 15 is arranged in control unit 10, the output signal of which is supplied to an external output stage which is not explicitly indicated in FIG. 1. As described above, the ignition point is obtained from an engine characteristics map in control unit 15 using the instantaneous operating parameters and the output stage is then activated accordingly. If a combustion knock has been detected in the cylinder to be activated, the ignition point for that cylinder is individually retarded. After a specifiable number of knock-free combustions in that cylinder, the ignition point is returned stepwise back to the engine characteristics map ignition point. A dynamic state is detected in dynamic recognition stage 14. This dynamic state is detected, for example, via the angle of aperture of the throttle valve and it is thus determined whether the driver wishes to initiate a load change.

Figure 2:
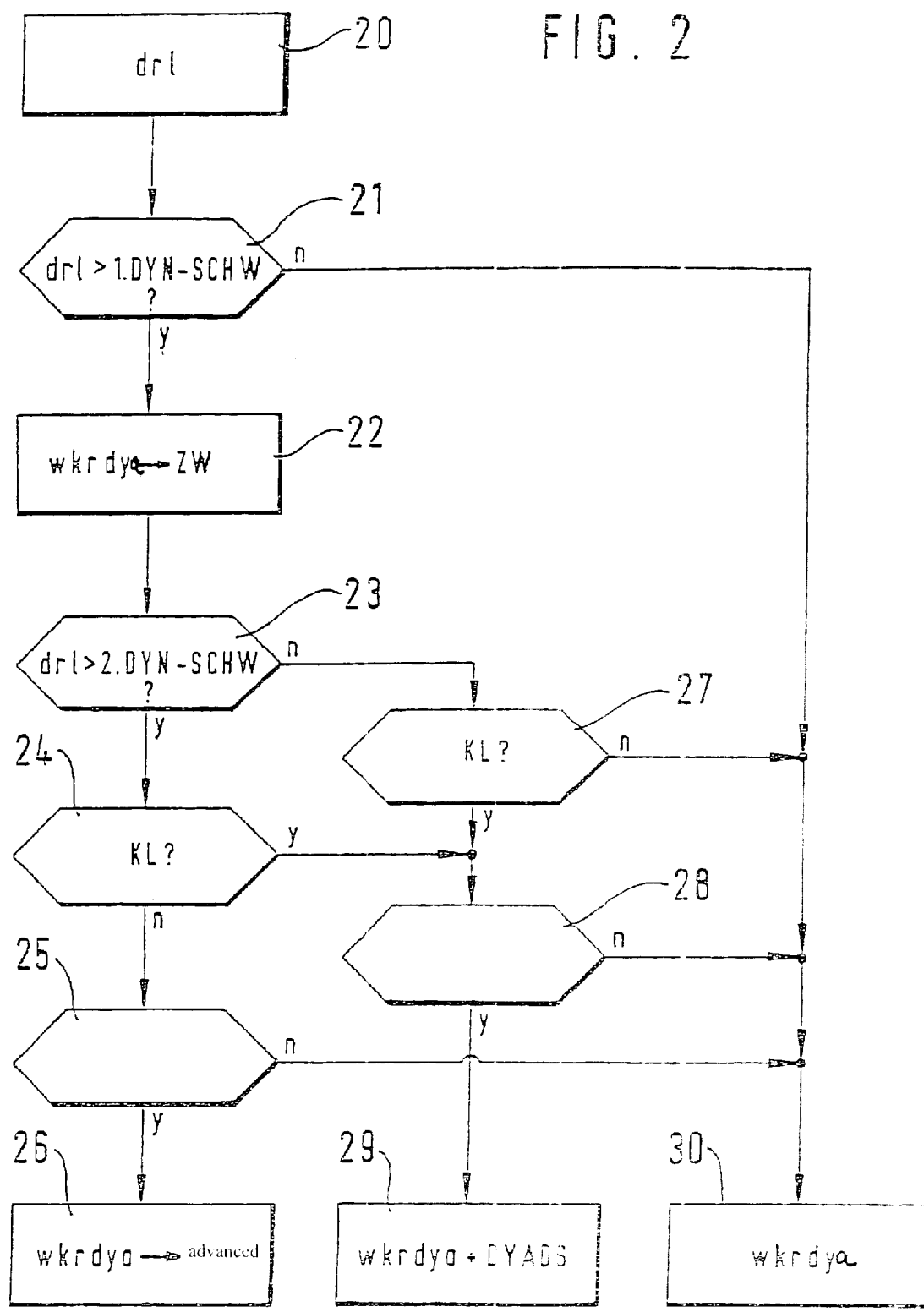
FIG. 2 shows a program flowchart for implementing the method according to the present invention.

FIG. 2 shows the basic flowchart of the ignition control with occurring dynamics. In a first operation step 20, the instantaneous load gradient drl is detected. In a downstream query 21, this load gradient drl is compared with a first specifiable dynamic threshold value 1.DYN-SCHW. If load gradient drl is greater than this first specifiable dynamic threshold, i.e., drl >1.DYN-SCHW, the YES output of query 21 leads to an operation step 22. In this operation step 22, a dynamic derivative action wkrdya is read out from a memory, the dynamic derivative action being added to instantaneous ignition angle ZW so that the ignition control Variable is retarded by the amount of this dynamic derivative action wkrdya. This additive retardation of the ignition takes place for all cylinders of the internal combustion engine.

Subsequently, it is checked in a query 23 whether load gradient drl detected in operation step 20 is greater than a second specifiable dynamic threshold 2.DYN-SCHW. In the event that drl >2.DYNSCHW, the YES output leads to a query 24 in which it is checked whether a knock KL has occurred with the instantaneously output ignition angle. If no occurrence of knock was detected in the analyzed combustions of the dynamic phase, the NO output of query 24 leads to a query 25. Here it is checked whether a specifiable number of knock-free combustions has already occurred with the ignition control variable determined by the knock control. If this is the case, the output dynamic derivative action wkrdya is reduced by one increment in an operation step 26 downstream of the YES output so that the ignition is advanced again and consequently adjusted closer to the knock limit. Operation closer to the knock limit also means better torque and accordingly greater efficiency.

If the response to query 23 as to whether the load gradient has also exceeded second specifiable dynamic threshold 2.DYN-SCHW is NO, the NO output of this query 23 leads to a query 27 in which the combustions are again monitored for the occurrence of knock on the dynamic phase. If a knock KL was detected, the YES output of query 27 leads to a downstream query 28, as with the YES output of query 24. Here detected knock event KL is evaluated in such a way that the strength of the knock event is detected and evaluated. In the case of a knock event that has exceeded a specifiable intensity, the instantaneously used dynamic derivative action wkrdya is increased by a specifiable amount so that the ignition as a whole is retarded.

Finally, the NO output of query 21, i.e., load gradient drl is smaller than first dynamic threshold 1.DYN-SCHW, the NO output of query 27, i.e., no knock has been detected, the NO output of query 28, i.e., the detected knock was only very weak, and the NO output of query 25, i.e., only a single or very few knock-free combustions were detected, are sent to an operation step 30. Here it is determined that dynamic derivative action wkrdya stored in the memory is retained. Subsequently, the program flow chart is run through once more to analyze the subsequent dynamic phase, a dynamic phase consisting of a specifiable number of combustion cycles. The adaptation itself occurs once each dynamic phase.

Thus when a load change occurs in the dynamic case, the ignition point is adjusted so as to provide maximum torque. In the specific case, this means that the ignition control variable is advanced. Simultaneously, an extreme advance setting of the ignition control variable results in an increase in the tendency to knock. With the method according to the present invention, a possibility is therefore created to skillfully reconcile the contradictory requirements for knock-free operation of the internal combustion engine and a torque which is as high as possible for a good level of efficiency of the internal combustion engine.

The definition of a first dynamic threshold for the load gradient ensures that very small short-term load changes do not already result in the ignition being retarded. Thus a high efficiency level is assured. With the method according to the present invention, the dynamic derivative action output after the first dynamic threshold was exceeded is adapted based on the instantaneous operating conditions and then stored in a memory until a change of the dynamic derivative action is to occur so that if the internal combustion engine is again operated in this range, it can be read out from the memory and used for retarding the ignition. For the adaptation of the dynamic derivative action, a differentiation is made between two possibilities. Firstly, the dynamic derivative action can be increased which means that the ignition is again retarded, or the dynamic derivative action can be decreased which means that the ignition is advanced in the direction of the knock limit. The dynamic derivative action is decreased if the load gradient has exceeded the second dynamic threshold and a specifiable number of knock-free combustions has taken place. In this case, it is assumed that the "safety interval" to the knock limit brought about by the dynamic derivative action is too large and the ignition. second dynamic threshold, then the intensity of occurring knock events checked. In the event that there is a very strong tendency to knock, the dynamic derivative action is increased so that the ignition is further retarded and thus moved away from the knock limit.

What is claimed is:

1. A method for an ignition control for an internal combustion engine with respect to an occurrence of a load dynamic, comprising the steps of:

determining an ignition control variable from a stored engine characteristics map based on detected operating parameters;

detecting a load gradient;

comparing the detected load gradient with a specifiable first dynamic threshold and an output of a specifiable dynamic derivative action that retards the ignition control variable if the detected load gradient exceeds the specifiable first dynamic threshold;

performing a comparison between the detected load gradient and a specifiable second dynamic threshold that is greater than the specifiable first dynamic threshold; and adapting stepwise the specifiable dynamic derivative action so that the ignition control variable is advanced if the detected load gradient exceeds the specifiable second dynamic threshold and if a specifiable proportion of knock-free combustions is present in a dynamic phase.

2. The method according to claim 1, further comprising the step of:

increasing stepwise the specifiable dynamic derivative action if knock events occur that exceed a specifiable knock intensity.

3. The method according to claim 1, wherein:

the specifiable first dynamic threshold and the specifiable second dynamic threshold are determined in an application.

4. The method according to claim 1, further comparing the step of:

obtaining the specifiable dynamic derivative action from the stored engine characteristics map.

5. The method according to claim 1, wherein:

the specifiable dynamic derivative action corresponds to an adapted specifiable dynamic derivative action, the method further comprising the step of:

always storing the adapted specifiable dynamic derivative action in a memory as a new learned value.

* * * * *